United States Patent [19]

Oyama et al.

[11] 4,350,796

[45] Sep. 21, 1982

[54] OIL-RESISTANT RUBBER COMPOSITION

[75] Inventors: Motofumi Oyama, Yokosuka; Kinro Hashimoto, Yokohama, both of Japan

[73] Assignee: Nippon Zeon Co. Ltd., Tokyo, Japan

[21] Appl. No.: 312,101

[22] Filed: Oct. 16, 1981

[30] Foreign Application Priority Data

Oct. 20, 1980 [JP] Japan .............................. 55-146734

[51] Int. Cl.$^3$ .......................... C08L 9/02; C08L 47/00
[52] U.S. Cl. .................................. 525/233; 525/235; 525/338
[58] Field of Search ........................ 525/233, 235, 338

[56] References Cited

U.S. PATENT DOCUMENTS 2,330,353  9/1943  Henderson .......................... 525/233
3,872,072  3/1975  Halasa ............................... 525/338

Primary Examiner—J. Ziegler
Attorney, Agent, or Firm—Sherman & Shalloway

[57] ABSTRACT

An oil-resistant rubber composition comprising a mixture of (1) a partially hydrogenated elastomer from an unsaturated nitrile monomer and a conjugated diene monomer wherein the degree of hydrogenation of the conjugated diene units is 50 to 98 mole %, and (2) a vinyl chloride resin.

5 Claims, No Drawings

OIL-RESISTANT RUBBER COMPOSITION

This invention relates to an oil-resistant rubber composition comprising a partially hydrogenated unsaturated nitrile-conjugated diene elastomer and a vinyl chloride resin.

Oil-resistant rubber compositions (to be referred to as polyblends) comprising an acrylonitrile-butadiene elastomer and a vinyl chloride resin have been used in fields requiring ozone resistance and oil resistance, particularly in various automotive applications.

In recent years, improvements in engines have been achieved to comply with automotive exhaust gas regulations, and one of such technological improvements includes the development of a system having an electronic fuel injection system. Gasoline now in use is more prone to become sour than before to give sour gasoline because it contains larger amounts of unsaturated hydrocarbons (olefins) than prior gasoline and the temperature of the gasoline in a fuel hose becomes higher as a result of using the electronic fuel injection system.

On the other hand, to meet resource and energy saving requirements, attempts have been made to use prior gasoline in mixture with an alcohol such as methanol, ethanol and butanol, but this alcohol-mixed gasoline, called "gasohol", also tends to become sour to give sour gasohol.

Consequently, the properties now required of oil-resistant rubber material are on higher levels than before, and new properties not required heretofore, such as sour gasoline resistance, sour gasohol resistance and static and dynamic sequential ozone resistance (ozone resistance after immersing in a solvent), have become important. Conventional polyblends, however, cannot easily meet these requirements, and it has become necessary to develop novel oil-resistant materials.

The present inventors made extensive investigations in view of the foregoing background. These investigations have led to the discovery that a material composed of a partially hydrogenated unsaturated nitrile-diene elastomer and a vinyl chloride resin has higher ozone resistance and sour gasoline resistance than before while having a good balance between oil resistance and cold resistance, and also possesses sour gasohol resistance and static and dynamic sequential ozone resistance.

According to this invention, there is provided a vulcanizable oil-resistant rubber composition comprising a mixture of (1) a partially hydrogenated unsaturated nitrile-conjugated diene elastomer with the conjugated diene units having a degree of hydrogenation of 50 to 98 mole% and (2) a vinyl chloride resin.

The partially hydrogenated unsaturated nitrile-conjugated diene elastomer used in this invention is obtained by hydrogenating the conjugated diene units of an unsaturated nitrile-conjugated diene elastomer produced by emulsion polymerization or solution polymerization, by usual methods (for example, those described in British Patent Specification No. 1,198,195 and British Patent Specification No. 1,558,491). Examples of the elastomer to be hydrogenated include a copolymer of at least one unsaturated nitrile such as acrylonitrile or methacrylonitrile and at least one conjugated diene such as 1,3-butadiene, isoprene and 1,3-pentadiene, and a product obtained by replacing a part of the conjugated diene units of the above elastomer by an unsaturated carboxylic acid such as acrylic, methacrylic, fumaric or itaconic acid and ester such as a methyl-, butyl- or 2-ethylhexyl-ester of the afore-said unsaturated carboxylic acids. Specific examples include an acrylonitrile-isoprene elastomer, an acrylonitrile-butadiene-isoprene elastomer, an acrylonitrile-butadiene-methyl acrylate elastomer, and an acrylonitrile-butadiene-butyl acrylate elastomer. The acrylonitrile-butadiene elastomer is most suitable.

The combined unsaturated nitrile content of the partially hydrogenated unsaturated nitrile-conjugated diene elastomer is usually 10 to 70% by weight, and is properly determined depending upon the compatibility of the elastomer with the vinyl chloride resin to be mixed and the end use of the resulting composition.

The degree of hydrogenation of the conjugated diene units of the elastomer is 50 to 98 mole%, preferably 70 to 98 mole%. If it is less than 50 mole%, desired rubber composition of this invention cannot be obtained. If it exceeds 98 mole%, vulcanization of the resulting composition with sulfur becomes too slow to be practical.

The vinyl chloride resin used in this invention denotes a homopolymer of vinyl chloride and a copolymer of vinyl chloride with a monolefinic monomer such as vinyl acetate.

The mixing ratio between the partially hydrogenated unsaturated nitrile-conjugated diene elastomer and the vinyl chloride resin is such that the amount of the vinyl chloride resin is at least 5 parts by weight per 100 parts by weight of the mixture of the elastomer and the vinyl chloride resin. If it is less than 5 parts by weight, static and dynamic sequential ozone resistance and sour gasohol resistance cannot be obtained. The preferred amount of the vinyl chloride resin is at least 10 parts by weight, especially at least 20 parts by weight. With an increase in the amount of the vinyl chloride resin, the mixture comes to have properties more like those of a resin, and its rubbery elasticity is impaired although it can be vulcanized. For this reason, the upper limit of the amount of the vinyl chloride resin is automatically determined but preferably the amount is less than 60 parts by weight. The mixing ratio between the elastomer and the vinyl chloride may be determined properly within the above-specified range depending upon the properties required and the end use of the mixture.

The polyblend in accordance with this invention can be vulcanized with sulfur, various vulcanizers, vulcanization accelerators, vulcanization aids, etc. which are normally used in the vulcanization of various diene-type rubbers.

There is no particular restriction on the method of preparing the polyblend of the invention, and it can be produced by applying any of the methods for the production of conventional polyblends. For example, it is prepared by kneading the partially hydrogenated unsaturated acrylonitrile-conjugated diene elastomer and the vinyl chloride resin under heat in a mixer such as a mixing roll or a Bunbury mixer; or by emulsifying a solution of the partially hydrogenated elastomer, mixing the emulsion with a latex of the vinyl chloride resin, co-precipitating the mixture, and then drying the product.

The polyblend of this invention can find more extensive applications in hoses, oil seals, packings, diaphragms etc. than conventional ones because it has higher ozone resistance, heat resistance and sour gasoline resistance than the conventional polyblends, and an excellent balance between cold resistance and oil resistance, and moreover, possesses excellent static and dynamic sequential ozone resistance and sour gasohol resistance.

The polyblend of this invention mixed with various compounding ingredients such as vulcanizers, accelerators, fillers, reinforcing materials, plasticizers, and antioxidants and as required, an elastomer such as an acrylonitrile-butadiene elastomer by a mixer such as a mixing roll or a Bunbury mixer, molded into a shape suitable for the end use, and vulcanized to give a final product.

The following examples illustrate the present invention more specifically. The degree of hydrogenation of the conjugated diene units of the elastomer in these examples was measured by the iodine value method, and expressed in mole%.

EXAMPLE 1

An acrylonitrile/butadiene elastomer (to be abbreviated NBR) having a combined acrylonitrile content of 41% by weight was dissolved in methyl ethyl ketone, and partially hydrogenated in a pressure vessel using Pd-carbon (5% by weight of Pd) as a catalyst to prepare a partially hydrogenated NBR.

The partially hydrogenated NBR and a vinyl chloride resin (to be referred to as PVC) were kneaded on a 6-inch roll heated at about 140° C. to prepare a polyblend having a hydrogenated NBR/PVC weight ratio of 70/30.

The polyblend was mixed with various compounding agents in accordance with the recipe shown in Table 1, and the resulting mixture was heated under pressure at 150° C. for 30 minutes to obtain a vulcanizate.

The properties of the vulcanizate were measured in accordance with JIS K-6301. The results are shown in Table 2.

[Static sequential ozone test]

A sample was immersed in JIS fuel oil C at 40° C. for 168 hours, and then dried in the air at room temperature for one week. The treated sample was then subjected to a static ozone test at 40° C. under an elongation of 20% with the concentration of ozone being kept at 40 pphm.

NC shows that there was no occurrence of cracks, and A-1 shows that a small number of cracks not perceptible to the naked eye but ascertainable by a magnifying glass (10×) occurred.

[Dynamic sequential ozone test]

A sample treated under the same conditions as in the static ozone test was subjected to a dynamic ozone test at 40° C. under a repeated stretch of 0 to 20% with the concentration of ozone being kept at 50 pphm. The results were rated as NC and A-1 in the same way as in the static sequential ozone test.

[Sour gasoline resistance test]

Rectangular test samples were immersed in JIS fuel oil B (isooctane/toluene=70/30 in vol.) containing 1% by weight of lauroyl peroxide for 72 hours at 40° C. The test solution was exchanged every 72 hours, and the dipping was continued. A period of 72 hours was taken as one cycle, and one sample was withdrawn from the solution at the end of each cycle. The withdrawn sample was then dried at 60° C. under reduced pressure for 1 hour, and then bent through 180°. The state of occurrence of cracks after bending was observed. NC shows that no crack occurred.

[Sour gasohol resistance test]

The same procedure as in the sour gasoline test was repeated except that the dipping solution was a mixture of JIS fuel oil B and methanol in a volume ratio of 80:20 containing 1% by weight of lauroyl peroxide.

TABLE 1

| | |
|---|---|
| Partially hydrogenated NBR | 70 parts by weight |
| PVC (1) | 30 parts by weight |
| Zinc oxide | 5 parts by weight |
| Stearic acid | 1 parts by weight |
| Sulfur | 0.5 parts by weight |
| SRF carbon black | 50 parts by weight |
| Accelerator (2) | 1.0 parts by weight |
| Accelerator (3) | 1.5 parts by weight |
| Antioxidant (4) | 2.0 parts by weight |
| Stabilizer (5) | 2.0 parts by weight |

(1) Zeon 103EP, a product of Nippon Zeon Co., Ltd.
(2) N—cyclohexyl-2-benzothiazole sulfenamide
(3) tetramethylthiuram disulfide
(4) octylated diphenylamine
(5) a stabilizer containing dibutyltin maleate as a main component

TABLE 2

| | | Run Number | | |
|---|---|---|---|---|
| | | Comparison | Invention | |
| Test Items | | 1 | 2 | 3 |
| NBR | % hydrogenation | | | |
| | 0 | 70 | | |
| | 72 | | 70 | |
| | 90 | | | 70 |
| PVC | | 30 | 30 | 30 |
| Before aging | | | | |
| Tensile strength (kg/cm²) | | 263 | 269 | 293 |
| Elongation (%) | | 530 | 490 | 460 |
| 200% Modulus (kg/cm²) | | 76 | 76 | 94 |
| Hardenss (JIS) | | 66 | 64 | 66 |
| Heat aging test in a test tube (125° C., 168 hours) | | | | |
| % Change in tensile strength | | −29 | −17 | −13 |
| % Change in elongation | | −49 | −37 | −35 |
| % Change in 200% modulus | | +91 | +86 | +83 |
| Change in hardness (points) | | +8 | +7 | +7 |
| Low-temperature Gehman test | | | | |
| T10 (°C.) | | −0.5 | −3.5 | −2.5 |
| T100 (°C.) | | −8.0 | −10.0 | −10.0 |
| JIS Fuel B immersion test (40° C., 48 hours) | | | | |
| % change in volume | | 45.3 | 45.2 | 46.0 |
| Static sequential ozone test | | | | |
| 10 hours | | NC | NC | NC |
| 300 hours | | NC | NC | NC |
| 1000 hours | | NC | NC | NC |
| Dynamic sequential ozone test | | | | |
| 10 hours | | NC | NC | NC |
| 100 hours | | NC | NC | NC |
| 200 hours | | A-1 | NC | NC |
| 300 hours | | Cut | NC | NC |
| 500 hours | | | NC | NC |
| 1000 hours | | | A-1 | NC |
| 1500 hours | | | Cut | NC |
| Sour gasoline resistance (180° Bending test) | | | | |
| 3 cycles | | Cracks formed | NC | NC |
| 10 cycles | | Broken | NC | NC |
| Sour gasohol resistance (180° Bending test) | | | | |
| 3 cycles | | Cracks formed | NC | NC |
| 6 cycles | | Crack(*) formed | NC | NC |
| 10 cycles | | | NC | NC |

(*)Cracks occurred during dipping of the sample in sour gasohol

The results given in Table 2 show that the polyblend of the invention has a better balance between oil resistance and cold resistance and better dynamic sequential ozone resistance, sour gasoline resistance and sour gasohol resistance then the conventional polyblend.

EXAMPLE 2

Partially hydrogenated NBR having a combined acrylonitrile content of 45% by weight or 50% by weight prepared in the same way as in Example 1 was mixed with PVC by the same procedure as in Example 1 to prepare a polyblend having a hydrogenated NBR/PVC weight ratio of 50/50.

The polyblend was mixed with various compounding agents in accordance with the compounding recipe shown in Table 3 on a cold roll. The resulting mixture was heated at 160° C. under pressure for 20 minutes to prepare a vulcanizate.

The properties of the vulcanizate were measured in accordance with JIS K-6301 and the testing methods described in Example 1. The results are shown in Table 4.

TABLE 3

| | |
|---|---|
| Partially hydrogenated NBR | 50 parts by weight |
| PVC (6) | 50 |
| Zinc oxide | 5 |
| Stearic acid | 1 |
| SRF carbon black | 40 |
| Sulfur | 0.5 |
| Plasticizer (7) | 40 |
| Stabilizer (5) | 2 |
| Tetramethylthiuram disulfide | 2 |
| N—cyclohexyl-2-benzothiazole sulfenamide | 1 |
| N—phenyl-N'—isopropyl-p-phenylene diamine | 1 |
| Octylated diphenylamine | 1 |

(6) Zeon 103EP-8, a product of Nippon Zeon Co., Ltd.
(7) TP-95, a product of Thiokol Chemical Corporation

TABLE 4

| | | Invention | | Comparison | |
|---|---|---|---|---|---|
| Test Items | | 4 | 5 | 6 | 7 |
| NBR bound VCN | 45 wt % | 50 | | 50 (un-hydrogenated) | |
| % hydrogenation | 92% | | | | |
| bound VCN | 50 wt % | | 50 | | 50 (un-hydrogenated) |
| % hydrogenation | 90% | | | | |
| PVC | | 50 | 50 | 50 | 50 |
| Before aging | | | | | |
| Tensile strength (kg/cm²) | | 225 | 153 | 208 | 230 |
| Elongation (%) | | 465 | 330 | 450 | 480 |
| 100% Modulus (kg/cm²) | | 39 | 45 | 41 | 48 |
| Hardness (JIS) | | 67 | 70 | 70 | 73 |
| Heat aging test in a test tube (120° C., 168 hours) | | | | | |
| % Change in tensile strength | | −8 | +31 | +3 | −5 |
| % Change in elongation | | −74 | −72 | −84 | −81 |
| % Change in 100% modulus | | +397 | — | — | — |
| Change in hardness (points) | | +22 | +22 | +24 | +24 |
| Sour gasoline resistance | | | | | |
| 6 cycles | | NC | NC | Crack | Crack |
| 10 cycles | | NC | NC | Broken | Broken |
| Sour gasohol resistance | | | | | |

TABLE 4-continued

| | Invention | | Comparison | |
|---|---|---|---|---|
| Test Items | 4 | 5 | 6 | 7 |
| 6 cycles | NC | NC | Crack | Crack |
| 8 cycles | NC | NC | Broken | Broken |
| 10 cycles | NC | NC | | |

EXAMPLE 3

Vulcanizates having much the same hardness were prepared from polyblends in various mixing ratios of partially hydrogenated NBR (the degree of hydrogenation 92%) from NBR having a combined acrylonitrile content of 45% by weight and PVC, and their properties were measured. The results are shown in Table 5.

The compounding recipe was the same as that shown in Table 3 except that the amounts of carbon black and the plasticizer were changed as shown in Table 5, and 2-mercaptobenzothiazole was used as the accelerator instead of N-cyclohexyl-2-benzothiazole sulfenamide. The vulcanization was carried out at 160° C. under pressure for 20 minutes.

TABLE 5

| | Comparison | Invention | | | | | |
|---|---|---|---|---|---|---|---|
| Test Items | 8 | 9 | 10 | 11 | 12 | 13 | 14 |
| partially hydrogenated NBR | 100 | 80 | 70 | 60 | 50 | 40 | 20 |
| PVC | — | 20 | 30 | 40 | 50 | 60 | 80 |
| SRF carbon black | 80 | 64 | 56 | 48 | 40 | 32 | 16 |
| Plasticizer | 20 | 28 | 32 | 36 | 40 | 44 | 52 |
| Before aging | | | | | | | |
| Tensile strength (kg/cm²) | 168 | 202 | 208 | 216 | 225 | 222 | 193 |
| Elongation (%) | 500 | 490 | 490 | 470 | 460 | 420 | 430 |
| 100% Modulus (kg/cm²) | 36 | 34 | 36 | 37 | 39 | 44 | 52 |
| Hardness (JIS) | 69 | 68 | 68 | 67 | 67 | 68 | 72 |
| Sour gasoline resistance | | | | | | | |
| 2 cycles | NC | NC | NC | NC | NC | NC | NC |
| 4 cycles | NC | NC | NC | NC | NC | NC | NC |
| 8 cycles | NC | NC | NC | NC | NC | NC | NC |
| Sour gasohol resistance | | | | | | | |
| 2 cycles | NC | NC | NC | NC | NC | NC | NC |
| 4 cycles | NC | NC | NC | NC | NC | NC | NC |
| 6 cycles | * | NC | NC | NC | NC | NC | NC |
| 10 cycles | * | NC | NC | NC | NC | NC | NC |

What we claim is:

1. An oil-resistant rubber composition comprising a mixture of (1) a partially hydrogenated elastomer from an unsaturated nitrile monomer and a conjugated diene monomer wherein the degree of hydrogenation of the conjugated diene units is 50 to 98 mole%, and (2) a vinyl chloride resin.

2. The rubber composition of claim 1 wherein the amount of the vinyl chloride resin is at least 5 parts by weight per 100 parts by weight of the mixture.

3. The rubber composition of claim 1 or 2 wherein the elastomer has an unsaturated nitrile content of 10 to 70% by weight.

4. The rubber composition of claim 1, 2 or 3 wherein the degree of hydrogenation of the conjugated diene units is 70 to 98 mole%.

5. The rubber composition of claim 1 which is vulcanized.

* * * * *